United States Patent [19]

Schultz

[11] Patent Number: 5,522,150
[45] Date of Patent: Jun. 4, 1996

[54] MODULAR AIR DRYER FOR COMPRESSED AIR WITH DESSICANT

[75] Inventor: Paul A. Schultz, Medina, Ohio

[73] Assignee: Allied Signal Truck Brake Systems, Elyria, Ohio

[21] Appl. No.: 196,055

[22] Filed: Feb. 14, 1994

[51] Int. Cl.⁶ ..................................... F26B 21/06
[52] U.S. Cl. .................................. 34/80; 96/113
[58] Field of Search ........................... 34/80, 81; 96/113, 96/137, 144; 55/213, 218

[56] References Cited

U.S. PATENT DOCUMENTS

| | | | |
|---|---|---|---|
| 3,344,631 | 6/1967 | Kreuter | 96/113 |
| 3,714,763 | 2/1973 | Suzuki | 96/113 |
| 4,236,902 | 12/1980 | Fricke | 96/137 |
| 4,487,617 | 12/1984 | Dienes et al. | |
| 4,816,047 | 3/1989 | Neal | |
| 4,892,569 | 1/1990 | Kojima | |
| 5,002,593 | 3/1991 | Ichishita et al. | |
| 5,006,317 | 11/1991 | Gross et al. | |
| 5,110,327 | 5/1992 | Smith | |
| 5,286,283 | 2/1994 | Goodell | 96/113 |
| 5,334,230 | 8/1994 | Stoka | |

FOREIGN PATENT DOCUMENTS

| | | |
|---|---|---|
| 3216395 | 11/1983 | Germany. |
| 1395788 | 5/1975 | United Kingdom. |
| 2179871 | 3/1987 | United Kingdom. |
| 02199768 | 7/1988 | United Kingdom. |
| 2201356 | 9/1988 | United Kingdom. |
| 93/05992 | 4/1993 | WIPO. |

Primary Examiner—John M. Sollecito
Assistant Examiner—Steve Gravini
Attorney, Agent, or Firm—Gus T. Hampilos

[57] ABSTRACT

Air dryer mechanism for a compressed air system includes a cover member, a desiccant housing, and an adapter member securing the desiccant housing to the cover member. In one embodiment, the adapter member is a integral purge volume which is releasably attached to both the cover member and to the desiccant housing and which defines a purge volume which stores purge air for later regeneration of the desiccant. In another embodiment, the adaptive member is a plate which is attached to both the cover member and the desiccant housing and provides flow paths communicating the supply port to the desiccant and the desiccant to the delivery port. The second embodiment, the cover member is provided with a purge volume port for connection to a remote purge volume.

11 Claims, 2 Drawing Sheets 5,522,150

MODULAR AIR DRYER FOR COMPRESSED AIR WITH DESSICANT

This invention related to a modular air dryer for use in a compressed air system.

BACKGROUND OF THE INVENTION

Compressed air systems, such as those used to operate the brakes of a heavy duty vehicle, commonly include an air dryer to remove moisture and oil entrained in the compressed air in order to protect the system from damage or failure. Air dryers used in such compressed air braking systems require a segregated quantity of air maintained in a purge volume for later backflow through the desiccant that removes the moisture from the air to purge the desiccant of the moisture. Purge volumes may be either an integral part of the air dryer, or a remote canister which is connected to the air dryer through an air line. Remote purge volumes are used where space constraints make it difficult or impossible to install an air dryer with an integral purge volume. It is also necessary to replace the desiccant periodically.

SUMMARY OF THE INVENTION

The present invention provides an air dryer in which both the desiccant canister and a purge volume housing are removably attached or "spun-on" a cover member which is permanently affixed to the vehicle. Accordingly, the desiccant canister can easily be removed and replaced when the desiccant becomes spent. Since the purge volume is attached by a simple spin-on connection, the air dryer according to the present invention may be configured in either a configuration which includes an integral purge volume, or may also be configured without the integral purge volume. Accordingly, the same basic tooling may be used to manufacture both types of air dryers.

BRIEF DESCRIPTION OF THE INVENTION

These and other advantages of the present invention will become apparent from the following description, with reference to the accompanying drawings, in which:

FIG. 1 is a cross-sectional view of an air dryer incorporating an integral purge volume and which is made according to the teaching of the present invention; and FIG. 2 is a view similar to FIG. 1 but illustrating an air dryer without an integral purge volume which is adapted to be connected to a remote purge volume.

DETAILED DESCRIPTION OF THE INVENTION

Figure 1:
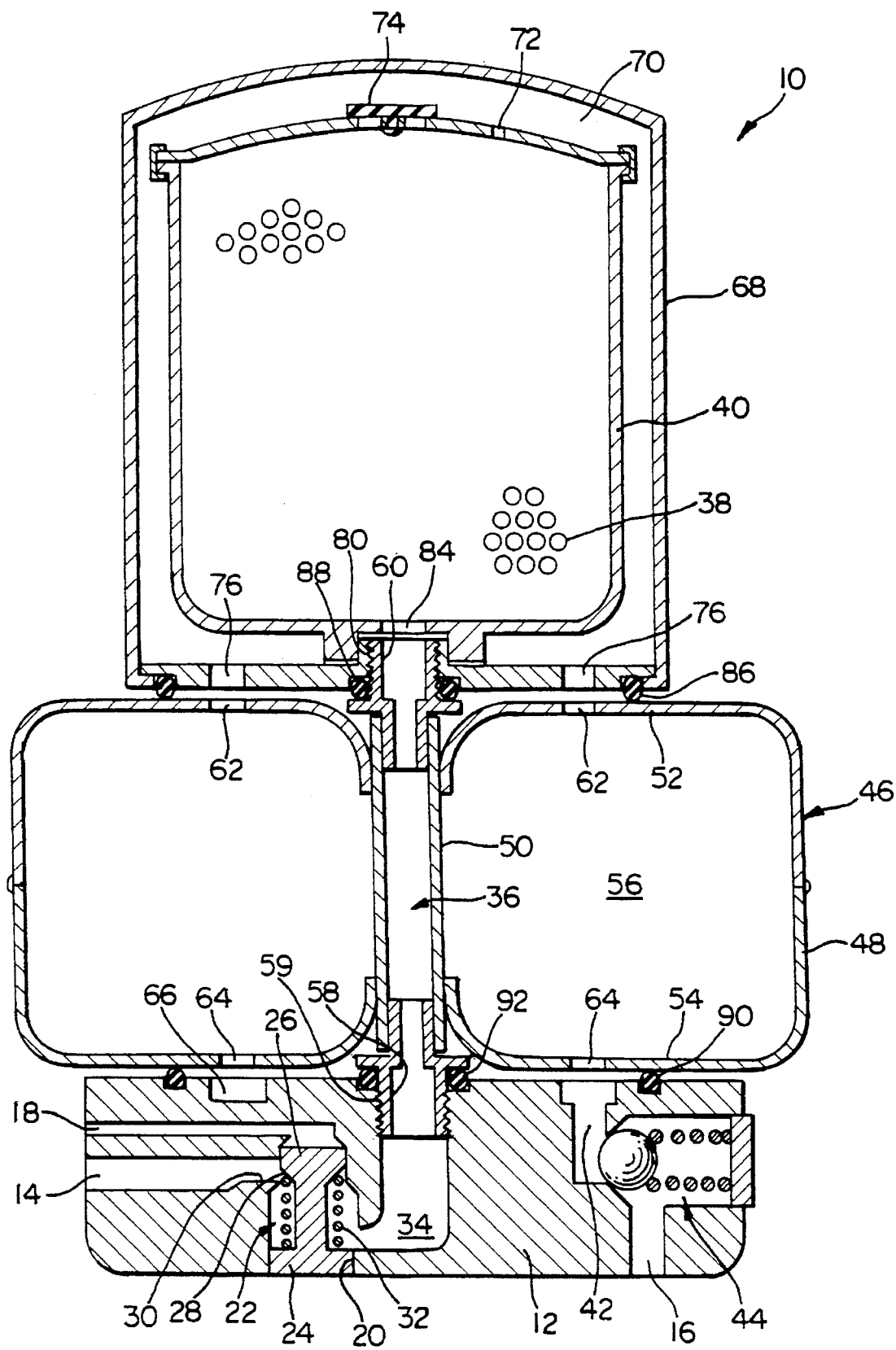

Referring now to FIG. 1 of the drawings, an air drying mechanism generally indicated by the numeral 10 includes a cover member 12 which is adapted to be permanently affixed to the vehicle or other apparatus upon which the air drying mechanism 10 is to be used. The cover member 12 is provided with a supply port 14 which is connected to a source of compressed air, such as the vehicle air compressor. Cover member 12 further includes a delivery port 16, which delivers dried air to a air storage reservoir (not shown) and control port 18, which receives a control signal from the vehicle governor (not shown). The governor responds to the pressure level in the air reservoir to which the delivery port 16 is connected to generate a pressure signal which unloads the compressor. This pressure signal is also transmitted to control port 18. A purge port 20 on cover member 12 is controlled by a purge valve generally indicated by the numeral 22. Purge valve 22 includes a valve element 24 which normally closes flow through the purge port 20. Purge valve 22 also includes a fluid pressure responsive portion 26 which is responsive to the pressure level of control port 18 to open the valve element 24 when a pressure signal is received at control port 18. A circumferentially extending surface 28 on purge valve 22 sealingly engages another surface 30 on the cover member 12 to close communication through supply port 14 during purging. A spring 32 yieldably urges the purge valve 22 upwardly, viewing FIG. 1, thereby closing valve element 24 against the purge port 20. Cover member 12 further includes a fluid receiving cavity 34 which defines a portion of a flow path 36 which communicates the supply port 14 with desiccant 38 contained by inner desiccant housing 40, as will be hereinafter explained. A passage 42 communicates with the delivery port 16, and a conventional check valve assembly 44 permits communication into the delivery port 16 from passage 42, but prevents communication in the reverse direction.

A purge housing generally indicated by the numeral 46 is removably attached to the cover member 12. The purge housing 46 includes an outer circumferentially extending wall 48, an inner circumferentially extending wall 50 and upper and lower transversely extending walls 52, 54 which interconnect the walls 48 and 50. The walls 48, 50, 52 and 54 cooperate to define an annular purge volume generally indicated by the numeral 56. The inner circumferentially extending wall 50 defines a portion of the flow path 36 such that the flow path 36 extends through the purge housing 46 to communicate cavity 34 with the desiccant 38. The purge volume 46 further includes axially projecting nipples 58, 60. The nipple 58 carries threads 59 to engage corresponding threads on the cavity 34. The transversely extending wall 52 is provided with circumferentially spaced apertures 62, and the transversely extending wall 54 is provided with circumferentially spaced apertures 64. The apertures 62, 64 and the purge volume 56 define a portion of a return branch of the flow path 36 which communicates the desiccant 38 with delivery port 16. The cover member 12 is provided with a circumferentially extending channel 66 which registers with the apertures 64 and thus communicates compressed air into the passage 42 and therefore into the delivery port 16.

The inner housing 40 which contains desiccant 38 is enclosed within an outer housing 68 which cooperates with the inner housing 40 to define a flow path 70 which communicates with the desiccant 38 through a flow restricting orifice 72 and a one-way check valve 74. Flow path 70 further includes apertures 76 which communicate the flow path 70 with the purge volume 56 through the apertures 62. The housing 68 is "spun-on" the nipple 60 which carries threads 80 which mate with corresponding threads on the outer housing 68. The flow oath 36 communicates with the desiccant 38 through aperture 84 in inner housing 40. Simple O-ring seals 86 and 88 seal to the outer housing 68 to the purge housing 46, O-rings seals 90 and 92 seal the purge housing 46 to the cover member 12.

In operation, compressed air is communicated through supply port 14, flows past purge valve 22 (the latter being maintained closed by the spring 32), through cavity 34 into flow path 36, and then into the desiccant 38 through the aperture 84. The desiccant 38 removes the moisture and oil entrained in the compressed air. The compressed air is discharged from the desiccant 38 into the flow path 70 through orifice 72 and check valve 74. The cleaned and dried compressed air then flows through apertures 76 and 62 into the purge volume 56, and then out of the apertures 64 into the passage 42, past the check valve 44, and through the delivery port 16 to the aforementioned air reservoir (not shown). It will be noted that the purge volume 56 will be charged to the same pressure level as is the air reservoir to which the delivery port 16 is communicated.

When a pressure signal is received at control port 18, indicating that the governor has unloaded the air compressor due to the fact that the pressure in the air reservoir has attained the predetermined pressure level, purge valve 22 moves downwardly, engaging the valve surface 28 with the valve surface 30, to thereby close off supply port 14, and simultaneously opening the valve element 24. Accordingly, the pressure level in the flow path 36 abruptly drops, thereby also reducing the pressure level in desiccant 38. Because of the one-way check valve, flow through the desiccant 38 is restricted to that permitted by the orifice 72 during purging. Accordingly, compressed air flows from the purge volume 56 through the flow path 70 and orifice 72, into the desiccant 38. As the air from purge volume 56 flows through the desiccant 38, the desiccant 38 is purged of its moisture in a manner well known to those skilled in the art. The purge air is communicated to atmosphere through the opening 84 the flow path 36, the cavity 34, and the valve element 24. It will be noted that the delivery port 16 is protected due to the closed check valve 44; accordingly, compressed air cannot flow out of the air reservoir to be used for purging. The purge valve 24 remains open until the compressor goes back on load.

Figure 2:
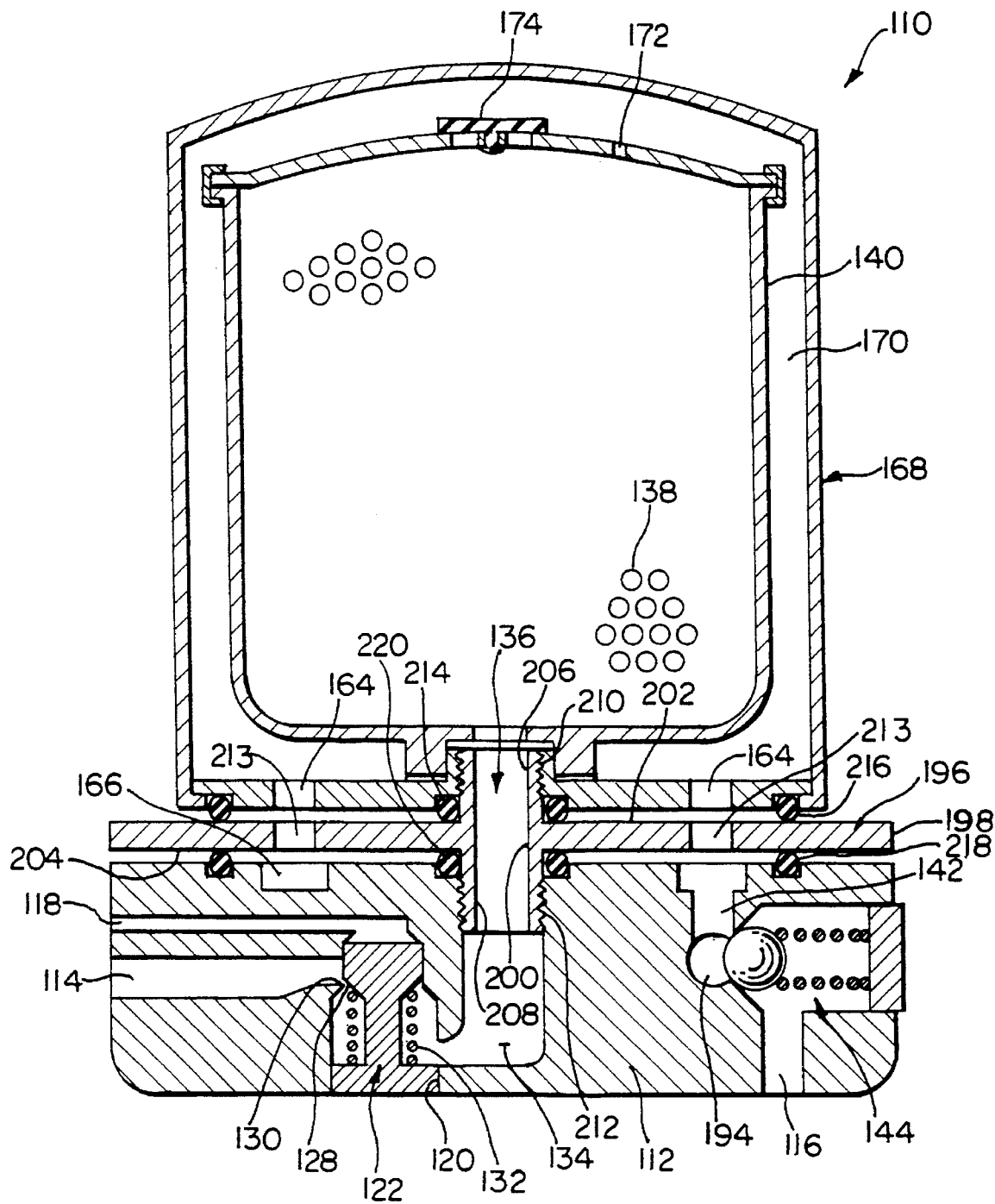

Referring now to the embodiment of FIG. 2, elements the same or substantially the same as those in the preferred embodiment of FIG. 1 retain the same reference character, but are increased by 100. The embodiment of FIG. 2 is an air dryer adapted for use with a remote purge volume. The remote purge volume may be a small reservoir mounted in any convenient location on the vehicle. An air line (not shown) communicates the purge volume with external purge volume port 194 in cover member 112. The purge volume port is located in passage 142 such that the check valve 144 is located between the purge volume port 194 and delivery port 116. For ease of manufacture, the cover members 12 and 112 may be identical; if an integral purge volume is used as illustrated in FIG. 1 the purge port on the cover member 12 is plugged.

In the embodiment of FIG. 2, the purge housing 46 is replaced by an adapter plate 196. The adapter plate 196 includes an outer circumferentially extending surface 198, an inner circumferential surface 200 and upper and lower transverse surfaces 202, 204. Projecting nipples 206, 208 are provided with threads as at 210, 212 respectively to provide a threaded, spin-on connection between the adapter plate 196 and the housing 168 and between the adapter plate 196 and the cover member 112. It will be noted that the inner circumference surface 200 defines the portion of the flow path 136 that communicates supply port 114 to desiccant 138. The adapter plate 196 is provided with circumferentially spaced apertures 212 that provide a portion of the flow path communicated to the desiccant 138 with the delivery port 116. O-ring seals 214, 216 seal the housing 168 against the transfer surface 202 of adapter plate 196, and O-ring seals 218, 220 seal transfer surface 204 of adapter plate 196 to the cover member 112.

Operation of the device of FIG. 2 is identical to that of FIG. 1. When the compressor (not shown) is on load, compressed air is communicated through desiccant 138 to passage 142. Compressed air communicates through purge volume port 194 to the purge volume, and also through check valve 144 to delivery port 116, and then to the aforementioned system air reservoir. During purging, due to the drop in pressure in the desiccant 138 due to opening of the purge valve 122 as described above, check valve 144 remains seated, and compressed air stored in the remote purge volume communicates through the purge volume port 194 through the aperture 212 and 164 and the flow path 170 to the desiccant 138 through the orifice 172. After the compressed air flow through the desiccant, it is discharged through the purge port 120.

As can be seen from FIG. 1, the purge housing 46 serves as the adapter member to attach the housing 68 to the cover member 12 in FIG. 1, and the purge volume housing 46 is replaced by the adapter plate 196 in the embodiment of FIG. 2, which uses a remote purge volume connected to the purge volume port 194. Accordingly, the housing 68, 168 are identical in both of the embodiments of FIG. 1 and FIG. 2, and the cover members 12 and 112 of the embodiments of FIGS. 1 and 2 are also identical, it being remembered that the purge port 194 is present in the cover member 12, but is rendered inoperative by plugging. Accordingly, an air dryer which is adapted for use either with an integral purge volume (FIG. 1) or a remote purge volume (FIG. 2) can be provided with the only difference being the replacement of the purge volume housing 46 with the adapter plate 196. Accordingly, the two commonly used air dryer systems can be provided with most of the parts being made of common tooling.

I claim:

1. Air drying mechanism for a compressed air system comprising a cover member having a supply port, a delivery port, a control port, a purge port, a purge valve responsive to a signal at said control port for causing said purge valve to open said purge port, a desiccant housing containing a desiccant, means defining a flow path communicating said supply port, said delivery port, and said purge port with said desiccant in said housing, an adapter member securing said desiccant housing to said cover member, first securing means for releasably securing said desiccant housing to said adapter member, and second securing means for releasably securing said cover member to said adapter member, said flow path including a first branch extending through said adapter member communicating said supply and purge ports with said desiccant and a second branch also extending through said adapter member communicating said desiccant with the delivery port.

2. Air drying mechanism as claimed in claim 1, wherein said adapter member includes inner and outer circumferentially extending surfaces, said inner surface defining a passage through which said first branch of said flow path communicating said desiccant with the supply and purge ports extends.

3. Air drying mechanism as claimed in claim 2, wherein said adapter member includes transverse surfaces extending between said circumferentially extending surfaces, said second branch of said flow path being in part defined by an aperture extends through said transverse surfaces.

4. Air drying mechanism as claimed in claim 3, wherein said adapter member is a substantially flat plate.

5. Air drying mechanism as claimed in claim 3, wherein said adapter member is a purge housing defining a purge volume for storing compressed air for purging said desiccant.

6. Air drying mechanism as claimed in claim 5, wherein said purge housing includes an outer circumferentially extending wall cooperating with an inner circumferentially extending wall to define said purge volume as an annular chamber between said inner and outer walls, said inner wall defining a passage within the inner wall through which said first branch of said flow path communicating said desiccant with the supply and purge ports extends.

7. Air drying mechanism as claimed in claim 6, wherein said transverse surfaces are a pair of transversely extending walls cooperating with said inner and outer circumferentially extending walls to define said purge volume.

8. Air drying mechanism as claimed in claim 1, wherein said adapter member is a substantially flat plate.

9. Air drying mechanism as claimed in claim 1, wherein said adapter member is a purge housing defining a purge volume for storing compressed air for purging said desiccant.

10. Air drying mechanism as claimed in claim 9, wherein said purge housing includes an outer circumferentially extending wall cooperating with an inner circumferentially extending wall to define said purge volume as an annular chamber between said inner and outer walls, said inner wall defining a passage within the inner wall through which said first branch of said flow path communicating said desiccant with the supply and purge ports extends.

11. Air drying mechanism as claimed in claim 10, wherein said transverse surfaces are a pair of transversely extending walls cooperating with said inner and outer circumferentially extending walls to define said purge volume.

* * * * *